United States Patent [19]

Nefy et al.

[11] Patent Number: 5,676,336
[45] Date of Patent: Oct. 14, 1997

[54] VEHICLE SEAT

[75] Inventors: Simcha Bar Nefy, Ramat Hasharon; Meir Singer, Mosha Beit Zayit; Avraham Atias, Ofra; Ehud Ayalon, Reut, all of Israel

[73] Assignee: Israel Aircraft Industries Ltd., Israel

[21] Appl. No.: 427,969

[22] Filed: Apr. 26, 1995

[30] Foreign Application Priority Data

Apr. 26, 1994 [IL] Israel ........................................ 109446

[51] Int. Cl.⁶ .................................................. B64D 25/115
[52] U.S. Cl. ........................... 244/122 R; 244/118.6; 297/216.17; 297/452.56; 248/548; 248/900
[58] Field of Search ..................... 244/122 R, 118.1, 244/118.6; 248/562, 569, 548, 900; 297/216.17, 216.13, 452.56, 452.63, 216.1; 188/67

[56] References Cited

U.S. PATENT DOCUMENTS

| | | | |
|---|---|---|---|
| 3,059,727 | 10/1962 | Fuchs | 297/216.17 |
| 3,059,966 | 10/1962 | Spielman | 244/122 R |
| 3,214,117 | 10/1965 | James et al. | 297/216.17 |
| 3,464,479 | 9/1969 | Baker | 297/452.63 |
| 3,985,388 | 10/1976 | Hogan . | |
| 4,349,167 | 9/1982 | Reilly . | |
| 4,523,730 | 6/1985 | Martin . | |
| 4,861,103 | 8/1989 | Vallee | 244/122 R |
| 4,997,233 | 3/1991 | Sharon . | |
| 5,013,089 | 5/1991 | Abu-Isa et al. | 297/452.56 |
| 5,152,578 | 10/1992 | Kiguchi | 244/122 R |

FOREIGN PATENT DOCUMENTS

| | | | |
|---|---|---|---|
| 2 510 512 | 7/1982 | France . | |
| 605036 | 5/1960 | Italy | 297/452.63 |

Primary Examiner—Andres Kashnikow
Assistant Examiner—Tien Dinh
Attorney, Agent, or Firm—Helfgott & Karas, P.C.

[57] ABSTRACT

A vehicle seat for absorbing energy exerted on the seat during impact including a seat frame having at least one generally vertical segment, a support apparatus including at least one generally vertical pole and at least one coupler fixedly mounted on the at least one pole of the support apparatus and circumferentially mounted on the at least one generally vertical segment of the seat frame, the at least one coupler having at least one deformation member engaging an indentation in the at least one segment such that displacement of the seat frame relative to the support apparatus occurs only when the force of the impact acting on the seat frame exceeds a preselected threshold. Additionally or alternatively, the vehicle seat includes a mounting structure associated with a vehicle floor and having a pair of primary support sites and a single, secondary support site, wherein the support apparatus includes a pair of substantially parallel primary support poles for supporting the seat frame, the poles being coupled to the seat frame and respectively mounted on the pair of primary support sites, and a pair of non-parallel secondary support poles for supporting the seat frame, jointly mounted on the secondary support site.

26 Claims, 7 Drawing Sheets

VEHICLE SEAT

FIELD OF THE INVENTION

The present invention relates to impact attenuation apparatus in general and, more particularly, to energy attenuating aircraft seats which meet aircraft safety requirements.

BACKGROUND OF THE INVENTION

The level of safety requirements for aircraft is constantly being increased by air travel regulators. These requirements apply to all newly-built aircraft, and are embodied in the U.S., for example, in the newly-released civilian standards FAR 23, 27 and 29, and the newly-released military standards MIL-S-58095A (AV) and MIL-S85510 (AS).

As an aircraft crashes generally in a downward direction, aircraft seats therein tend to continue traveling downwards. Thus, an occupant who remains seated during the crash is subject to tremendous impact forces which normally result in serious, and possibly fatal, injury to the occupant. However, the degree of injury suffered by the occupant can be reduced by dissipating part of the energy normally absorbed by the occupant into systems designed for that purpose.

Various energy absorbing systems have, therefore, been developed to reduce the impact energy that would otherwise be absorbed by occupants during an aircraft crash.

In a typical crash situation, the aircraft may be expected to dissipate up to approximately 50% of the crash energy through the landing gear while an approximately additional 15% will be dissipated through the controlled crash of the fuselage structure. The remaining crash energy is, inevitably, absorbed within the aircraft, partly by the occupants and partly by internal elements of the aircraft. Thus, reduction of the impact on the occupants can be achieved only through energy dissipation within the internal aircraft elements, such as the seats.

U.S. Pat. No. 4,523,730 to Martin describes an energy absorbing seat arrangement, particularly for a helicopter, in which a seat pan is carried by a frame slidably mounted on parallel upwardly extending pillars secured to the helicopter. According to one embodiment described in Martin, under normal (non-crash) conditions, downwards sliding of the frame on the pillars is prevented by metal rods fixed to the pillars which extend through drawing dies fixed to the seat frame. In an alternative embodiment of Martin, the rods and dies are replaced by a mandrel and a deformable metal tube, respectively. The mandrel extends through the tube.

In the event of a crash in which rapid downward movement of the helicopter and the pillars is halted suddenly, the seat and seat frame continue to move downwardly, sliding along the pillars, while drawing the rods through the dies, or the mandrel through the tube, to dissipate the kinetic energy of the seat and its occupant relatively gradually.

U.S. Pat. No. 4,997,233, to the present applicant, discloses a light weight seat for an aircraft having energy attenuation apparatus. The attenuation apparatus described in this patent reduces the impact acting on the seat in a preselected direction by converting part of the impact energy into controlled motion of a support element of the seat toward the preselected direction. Such motion occurs only when the impact force exceeds a preselected threshold, typical of crashing, in which case the impact energy resulting from the excessive force is absorbed through plastic deformation of an element designed for that purpose which impedes the motion of the support element. The light weight of this seat is partly due to the construction of the seat such that the energy attenuation apparatus is part of the back support apparatus.

There are various ways of mounting a vehicle seat to the floor of a vehicle. Aircraft passenger seats, particularly pilot and co-pilot seats, are generally slidably mounted on parallel rails which allow convenient adjustment of the position of the seat along an axis parallel to the rails. The seat is generally mounted on at least four, spaced apart, mounting locations, two on each rail.

Dislocation of a rail in response to floor deformation resulting from a crash situation includes a "roll" component, defined as the angle of rotation of a rail about its own axis, and a "pitch" component, defined as the angular rotation of the rail about an axis perpendicular to the rail.

SUMMARY OF THE INVENTION

It is an object of the present invention to provide a vehicle seat including improved energy attenuation apparatus for absorbing impact exerted on the seat, particularly during crash situations.

It is a further object of the present invention to provide a vehicle seat including an improved mounting apparatus, which reduces the effect of floor deformation on the structure of the seat and on the energy attenuation ability thereof. Furthermore, the present invention seeks to provide a simpler and lighter seat structure.

Additionally, it is an object of the present invention to provide a vehicle seat including improved apparatus for adjusting the tilt angle of the back of the seat. In a preferred embodiment of the invention, the back tilt adjustment apparatus operates independently of other seat adjustment apparatus and/or energy attenuation apparatus included in the seat.

According to one aspect of the present invention, the vehicle seat includes apparatus for attenuating impact exerted on the seat in a preselected direction.

In a preferred embodiment of this aspect of the invention, the vehicle seat includes a seat frame having at least one generally vertical, preferably tubular, segment. The at least one segment is associated with a support apparatus by virtue of at least one coupler having a rigid member pressed against dents or grooves. When impact beyond a preselected threshold is exerted on the vehicle seat, such as in a vertical direction, at least part of the impact energy is dissipated into controlled vertical motion of the frame relative to the support apparatus. During this motion, the rigid member of the at least one coupler forms a deformation pattern along the at least one segment. The at least one segment is preferably tubular.

Preferably, the preselected axis is generally vertical with respect to the floor of the vehicle, thereby providing appropriate impact attenuation in a vertical crash situation.

Alternatively or additionally, the preselected axis is generally horizontal to the floor of the vehicle to provide impact attenuation in a longitudinal direction and to decrease longitudinal components of floor reaction forces in case of a vehicle crash.

Further in accordance with this aspect of the present invention, the at least one coupler includes at least one rigid ball urged against an indentation in the tubular segment. In a preferred embodiment of this aspect of the present invention, the force at which the at least one ball is urged against the indentation is adjustable.

In a preferred embodiment of the present invention, the vehicle seat includes an inner frame tiltably adjustable with respect to the seat frame.

According to another aspect of the present invention, the vehicle seat comprises a seat frame, a mounting structure associated with a vehicle floor and having a pair of primary support sites and a single, secondary support site, a pair of substantially parallel primary support poles for supporting the seat frame, the poles being coupled to the seat frame and respectively mounted on the pair of primary support sites, and a pair of non-parallel secondary support poles for supporting the seat frame, jointly mounted on the secondary support site. Such mounting of the vehicle seat moderates the effect of floor deformation, particularly pitch deformations, on the structure of the seat and reduces bending loads on the structure of the seat, enabling the construction of a lighter seat. The position of the seat is preferably adjusted by sliding the seat along a pair of substantially parallel rails included in the mounting structure.

According to yet another aspect of the present invention, the mounting structure of the vehicle seat includes a front support arrangement which maintains the front portion of the seat substantially static, in the event of a crash situation, while allowing energy-attenuating motion of the back portion of the seat to absorb the impact of the crash. The front support arrangement preferably includes a pair of non-parallel support poles, such as the secondary support poles described above, for supporting the seat frame on a single support site under the front portion of the seat. This structure ensures articulated energy-attenuation, whereby a predefined space underneath the seat is not violated during energy attenuation. This crash-safe, underseat, space may be used as a safe leg-room and/or for safe storage of various articles.

According to a further aspect of the present invention, the vehicle seat includes apparatus for attenuating impact energy by controlled tearing of a substrate designed for that purpose. In a preferred embodiment of this aspect of the present invention, the vehicle seat includes a support sheet mounted on a rigid frame, preferably through a connecting strap, using a series of pins driven through the support sheet and/or the connecting strap. When impact beyond a preselected threshold acts on the vehicle seat in a direction generally perpendicular to the support sheet, the ends of the support sheet tend to move inwardly from the rigid frame due to high mechanical tensions in the sheet. In a preferred embodiment of the invention, the strength of the support sheet and the number and type of pins used are chosen such that, in response to high tensions, the pins tear the sheet and/or the strap in a controlled manner, thereby attenuating some of the impact exerted on the seat.

In yet another aspect of the present invention the vehicle seat includes a foldable seat pan assembly which is also tiltably adjustable.

BRIEF DESCRIPTION OF THE DRAWINGS

The present invention will be better understood from the following detailed description of preferred embodiments, taken in conjunction with the following drawings in which.

DETAILED DESCRIPTION OF PREFERRED EMBODIMENTS

Figure 1:
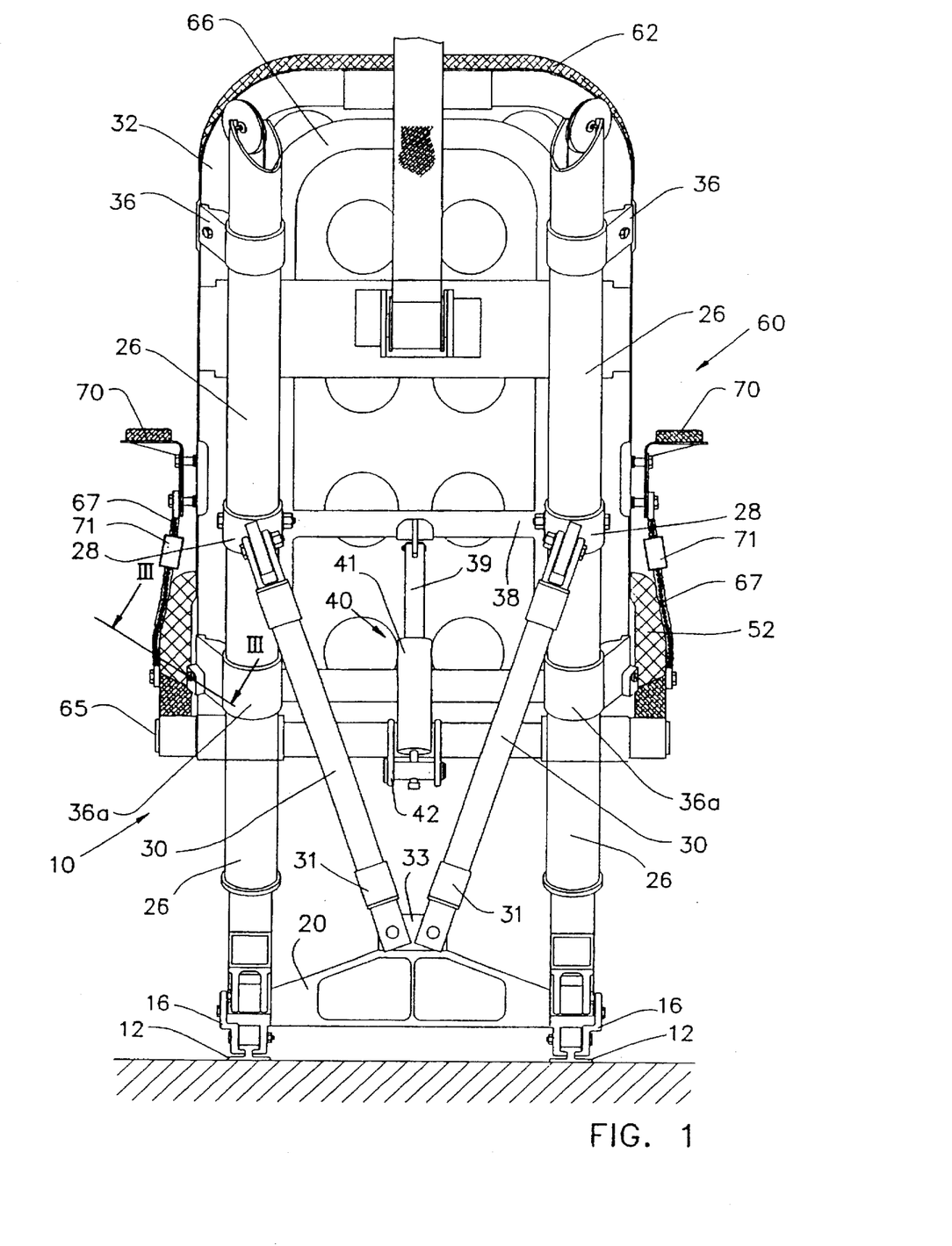
FIG. 1 is a rear view of a vehicle seat constructed and operative in accordance with one preferred embodiment of the present invention.
Figure 2:
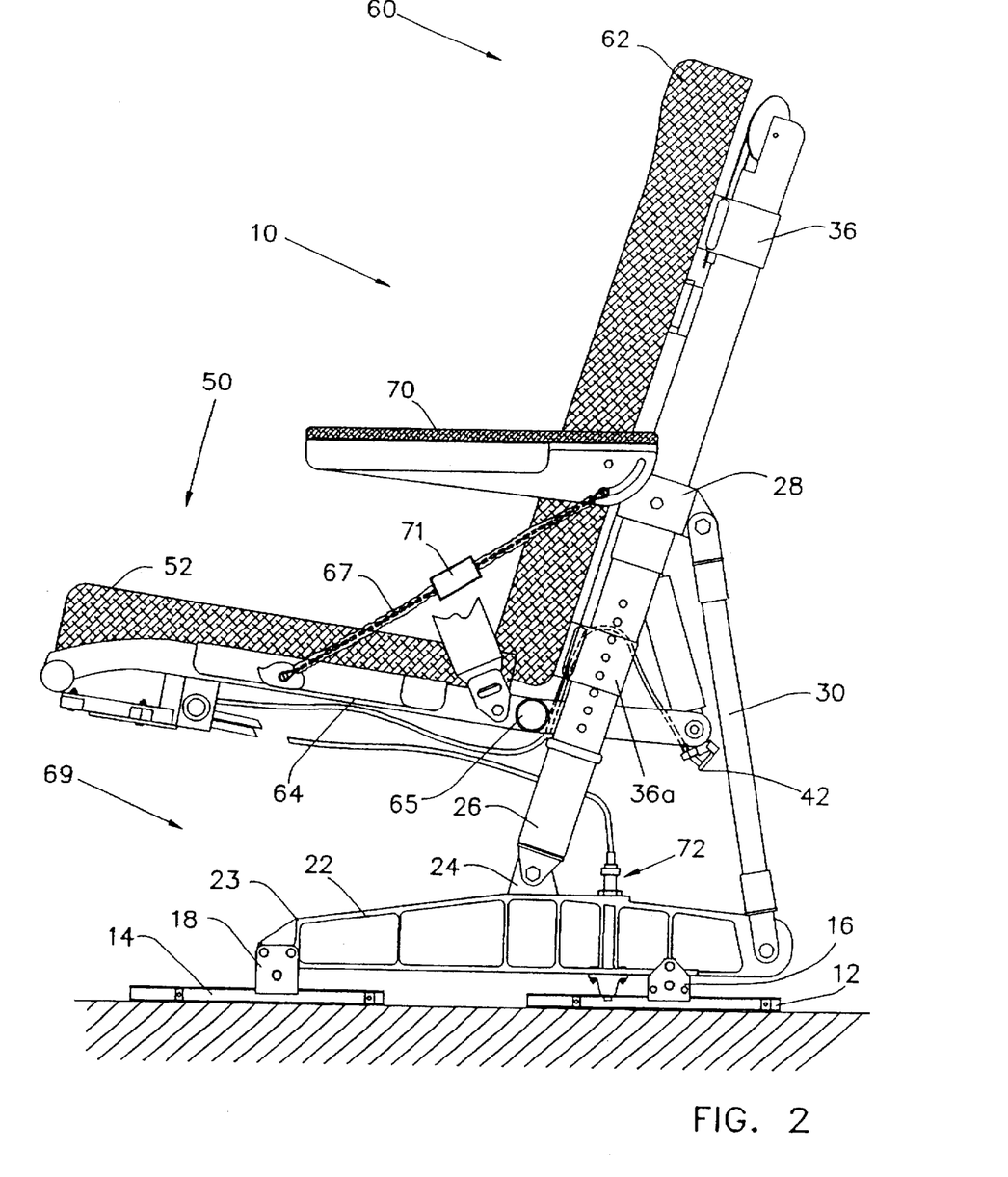
FIG. 2 is a side view of the vehicle seat of FIG. 1.

Reference is now made to FIGS. 1 and 2, which are respective rear and side view illustrations of a vehicle seat 10, preferably an aircraft pilot seat, constructed and operative in accordance with one preferred embodiment of the present invention, including apparatus for mounting the seat on a floor of a vehicle. Seat 10 includes a substantially horizontal pan portion 50, preferably having a pan cushion 52, and a substantially vertical back portion 60, preferably having a back cushion 62. Pan portion 50 is preferably pivotally connected to back portion 60, through a corner axis 65, and supported in a desired sitting position by a pair of side cables or chains 67 and a pair of angular adjustors 71. An elongated connector 42, described below, is mounted on corner axis 65 and extends rearly therefrom.

It is to be appreciated that pan portion 50 may be a foldable seat pan assembly which is also tiltably adjustable. This allows for an easy egress and ingress of a user to the seat, especially in vehicles having limited space such as small aircraft. Furthermore, the user may tilt the seat pan at different angles to allow adjustment for an operating mode and for a rest mode.

Back portion 60 includes a rigid seat frame 32, preferably constructed from a tubular profile of a relatively light weight material, for example an aluminum alloy. In a preferred embodiment of the present invention, seat frame 32 is mounted on a pair of substantially parallel primary support poles 26 using couplers 36 and 36a, described below in greater detail. The grip of couplers 36a on frame 32 is such that, during normal operating conditions, frame 32 is prevented from sliding along poles 26, as further described below. A pair of cushioned arm rests 70 are preferably foldably mounted on both sides of back portion 60, respectively. For added seating comfort, pan portion 50 of seat 10 is preferably provided with a pan cushion support 64 located underneath cushion 52 of pan portion 50.

In a preferred embodiment of the invention, back portion 60 of seat 10 includes an inner seat frame 66 adjustably associated with seat frame 32. Inner seat frame 66 includes a horizontal support bar 38 substantially parallel to corner axis 65 and to a rear connecting support truss 20. A telescopic adjustment member 40 is mounted between bar 38 and elongated connector 42 of axis 65. In a preferred embodiment, inner frame 66 is pivotally mounted on corner axis 65 such that changes in the length of telescopic adjustment member 40 result in corresponding angular tilt of frame 66 relative to the seat frame 32. Adjustment member 40 is preferably a hydraulic telescopic adjustment member having an inner portion 39 and an outer portion 41. By varying the overlap between portions 39 and 41, member 40 is adjusted to a desired length.

It should be appreciated that by appropriate adjustment of member 40, in the manner described above, inner frame 66 can be adjusted to a desired tilt with respect to seat frame 32. Since cushion 62 is supported mainly against frame 66, the tilt of cushion 62 corresponds to the tilt of inner frame 66. Thus, in this preferred embodiment of the invention, back cushion 62 can be adjusted to a desired tilt, suitable for the person occupying seat 10, by adjusting the length of member 40.

Primary support poles 26 are preferably tiltably mounted on a mounting structure 69, which consists of a pair of substantially horizontal, substantially parallel, side support trusses 22, and a rear connecting support truss 20, pivotally mounted across the rear ends of the side support trusses. The lower ends of the primary support poles 26 are pivotally mounted on respective primary support sites 24 located approximately at the centers of the upper surfaces of the side support trusses. A pair of non-parallel secondary support poles 30 are pivotally coupled to the primary support poles 26, respectively, through respective cuffs 28. The lower ends 31 of the secondary poles are jointly attached to a single secondary support site 33 positioned at the approximate center of the upper surface of the connecting support truss 20, and can radially pivot around their attachment sites. It is to be understood that although the primary support poles 26 are pivotally mounted on the primary support sites 24, under normal operating conditions the primary poles do not move due to the support of the secondary support poles 30 and the side trusses 22.

A pair of rear sliders 16 are fixedly mounted under side trusses 22, near the rear ends thereof, and a pair of front sliders 18 are fixedly mounted under the front ends 23 of the trusses. In a preferred embodiment of the invention, mounting structure 69 of seat 10 is adjustably mounted on two pairs of parallel floor rails, namely rear rails 12 and front rails 14, by virtue of rear sliders 16 and front sliders 18, respectively. Alternatively, rail pairs 12 and 14 may be integrated into a single pair of longer parallel rails (not shown). In this alternative embodiment, sliders 16 are mounted across the rear portions of the integrated rails and sliders 18 are mounted across the front portions of the integrated rails.

Side trusses 22 are preferably in locking engagement with rails 12 and 14 during normal operation of the vehicle by means of corresponding locking mechanisms 72, each passing through a respective side truss 22, so as to prevent seat 10 from sliding along the rails during motion of the vehicle. This locking may be released when the position of seat 10 on the vehicle floor is to be adjusted. Adjustment of the position of seat 10, backwards and forward, is achieved by sliding of sliders 16 and 18 along rails 12 and 14.

As is also well known in the art, the use of four mounting locations and four sliders provides firm support to seat 10, as required particularly in aircraft seats, while allowing convenient adjustment of the position of the seat. However, in contrast to the prior art, seat 10 is not directly supported by the four mounting locations, but rather by the three support sites, namely the two primary support sites 24 and the secondary support site 33 on the rear connecting support truss 20.

It will be appreciated by a person skilled in the art that the use of three support sites for seat 10, as described above, improves the reaction of seat 10 to a typical crash situation, wherein the floor of the vehicle becomes considerably deformed. In particular, when floor deformation results in uneven displacement of rear rails 12, e.g. left rear rail 12 becomes elevated or lowered with respect to right rear rail 12, the corresponding displacement of the secondary support site 33 is considerably less than the displacement of the rear rails, such as by 50%. Thus, when seat 10 is subject to uneven floor deformation (e.g. pitch deformation), which commonly occurs in crash situations, the mounting arrangement of the present invention limits the degree of deformation, such as bending, transferred to the seat. This structure of the mounting arrangements also reduces undesired deformation of energy absorbing apparatus mounted on the seat, such as the apparatus described below, thus allowing such apparatus to optimally absorb the energy of the impact and protect the occupant of the seat.

An energy absorbing apparatus will now be described with reference to FIG. 3, which is an enlarged cross-section from FIG. 1 of one of primary poles 26 at the location of the respective coupler 36a.

As described above, seat 10 is carried by seat frame 32 which is mounted on parallel primary support poles 26 by virtue of couplers 36 and 36a. Couplers 36 are fixedly attached to frame 32 and slidingly mounted on poles 26, while couplers 36a are fixedly attached to poles 26 and pressure-grip frame 32, as will be explained below. According to a preferred embodiment of the present invention, under normal conditions (i.e when relatively low impacts are acting on seat 10), sliding of frame 32 with respect to poles 26 is prevented due to the grip applied by couplers 36a to frame 32.

In a preferred embodiment of the invention, each of the couplers 36a comprises a mounting portion 86, which is fixedly mounted on a preselected location of pole 26, and grip portion 84, which is associated with a preselected location 34 on frame 32. Grip portion 84 includes at least one, and preferably several, rigid members 80, which may be rigid metal balls, each associated with at least one, respective, adjustment screw 82. Radially inward dents or circumferential grooves 88, each adapted to match a rigid member 80, are preferably formed in location 34 at the sites where rigid members 80 engage the surface of frame 32.

Rigid members 80 are pressed against locations 34 by adjustment screws 82 which are preferably pre-adjusted so that rigid members 80 are pressed against locations 34 at respective dents 88, applying a predetermined pressure thereat, to thereby provide locking engagement between the frame and grip portions 84 of couplers 36a. It should be noted that screws 82 enable continuous adjustment of the pressure applied by members 80 at locations 34.

In an alternative embodiment of the invention, rigid members 80 and dents 88 have preselected fixed positions, preferably chosen in accordance with crash simulation tests performed on seat 10, such that adjustment screws 82 may be replaced with fixed, i.e. unadjustable, supports (not shown in the drawings). This results in lower-cost, lower maintenance, couplers 36a. In another alternative embodiment, rigid members 80 and screws 82 are replaced by adjustable rigid screws (not shown). The tips of such dual-purpose screws also perform the function of members 80.

Figure 3:
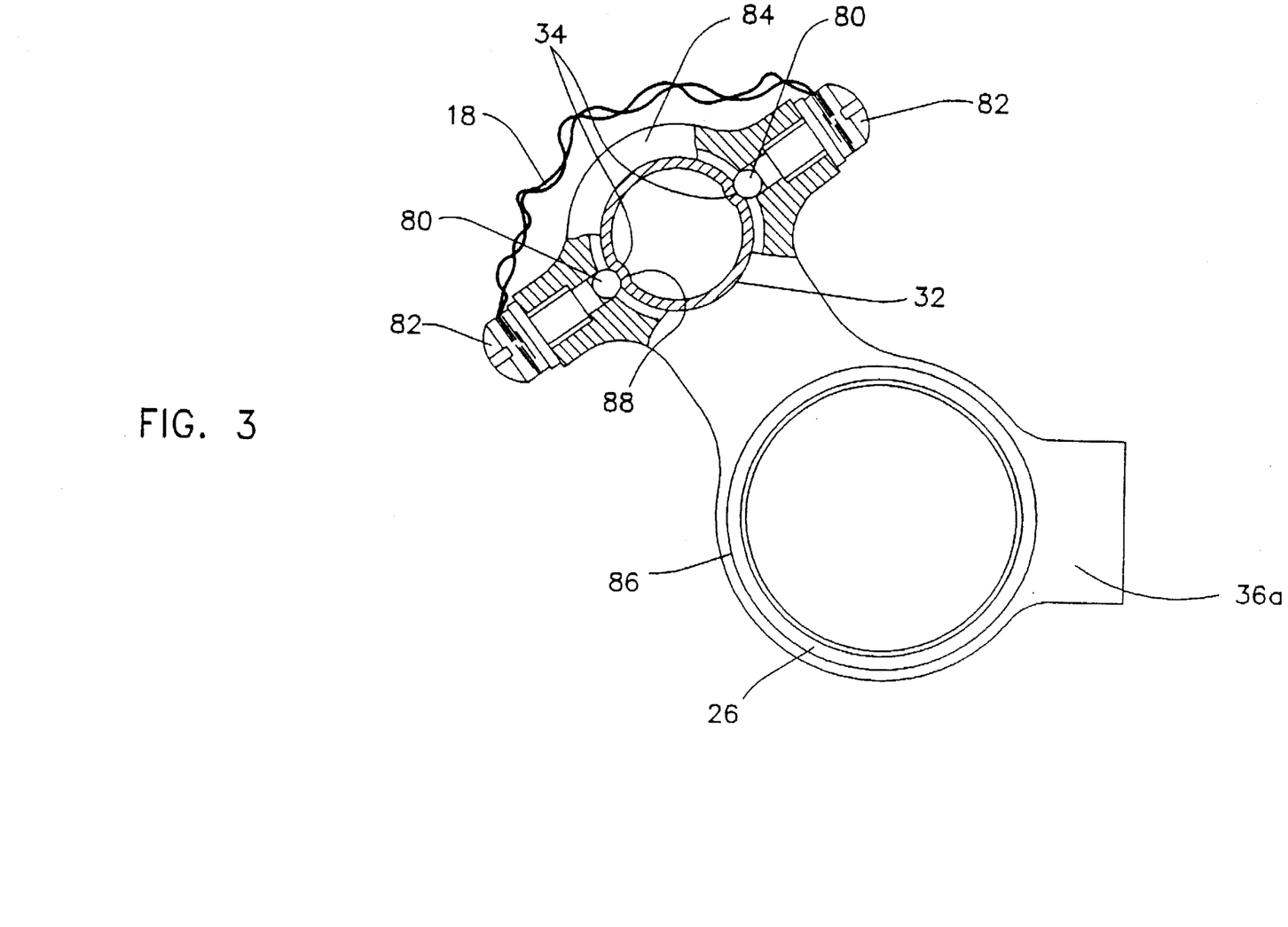
FIG. 3 is a cross section of a coupling apparatus included in the vehicle seat of FIG. 1, taken across section lines III—III.

The absorbing apparatus of FIG. 3 is operable to dissipate forces which are activated along an axis. Typically, in a crash, large forces are generated in a vertical axis. However, in a crash in which the vehicle dives, large forces may be generated in a horizontal axis. It is to be appreciated that the apparatus of FIG. 3 may be employed to dissipate energy in a horizontal axis by replacing rear and front sliders 16 and 18 with corresponding sliders, preferably in the form of tubes, which include the apparatus of FIG. 3. Alternatively or additionally, truss 22 may be replaced with a truss which may be a tube including the apparatus of FIG. 3. In such cases, the tube sliders including the apparatus of FIG. 3, and/or the tube-formed truss may dissipate forces in a longitudinal direction.

It is to be further appreciated that other embodiments of couplers 36a may be equally suitable for the purposes of the present invention, such as the embodiment described below with reference to FIG. 4C.

In a preferred embodiment of the invention, during normal operation of the vehicle, vertical sliding of locations 34 relative to respective grip portions 84 of coupler 36a is prevented by virtue of the locking engagement between members 80 and dents 88. However, in the event of a crash in which rapid downward movement of the vehicle including poles 26 and couplers 36a is halted suddenly, seat 10 including frame 32 continues to move downwardly, while forcefully drawing frame 32 through portions 84 against firm rigid members 80.

Since rigid members 80 are located radially inwards from the surfaces of locations 34, the forceful vertical motion of the tubular portion of the frame 32 against members 80 causes an elongated deformation pattern along frame 32. It should be appreciated that this interaction between members 80 and frame 32 dissipates part of the energy involved in the downward impact. Moreover, the controlled downward motion of seat 10 along poles 26 further moderates the impact of the crash on seat 10 and, more importantly, on the occupant of seat 10.

Figure 4A:
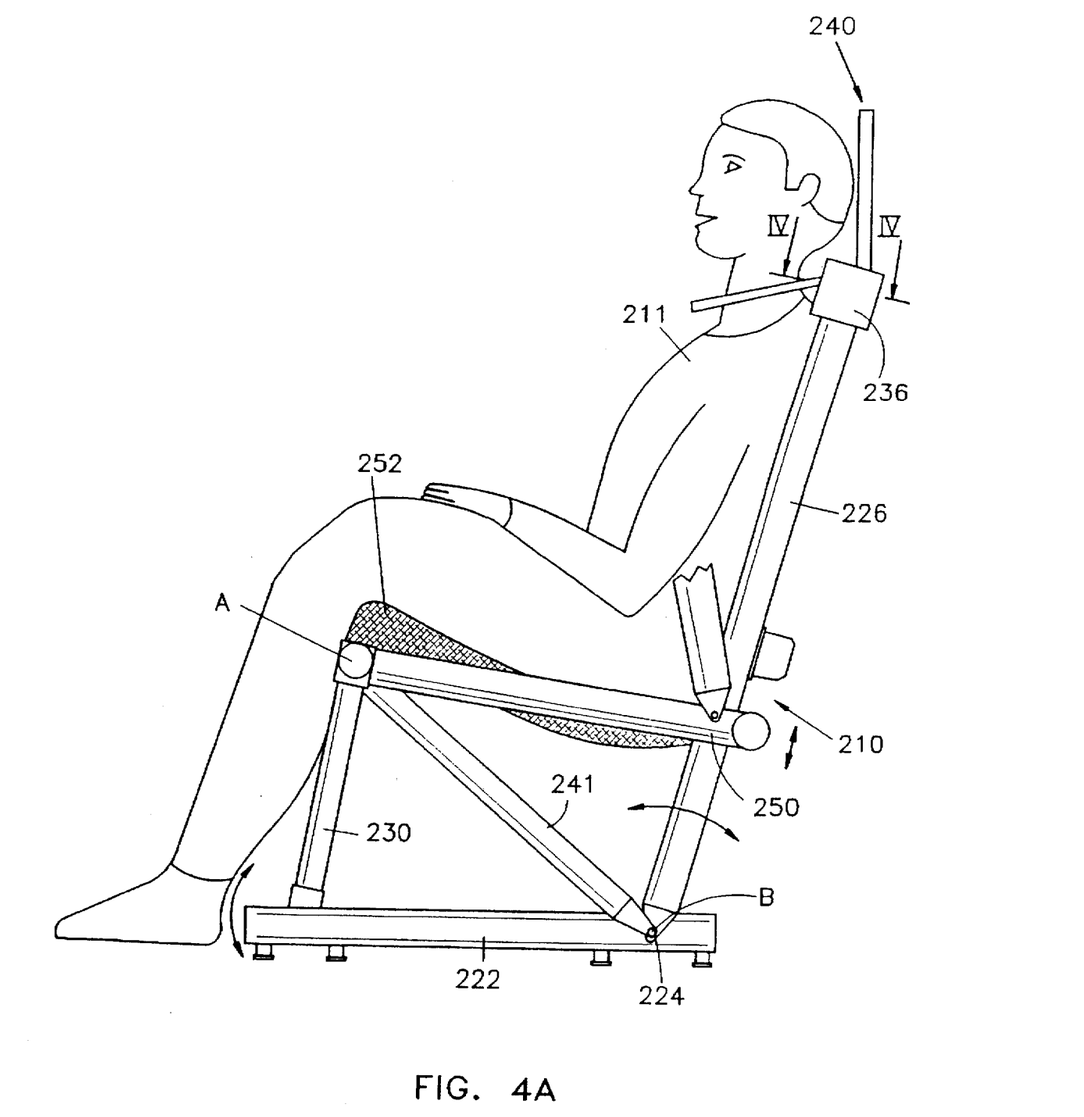
FIG. 4A is a side view of a vehicle seat in accordance with another preferred embodiment of the present invention.
Figure 4B:
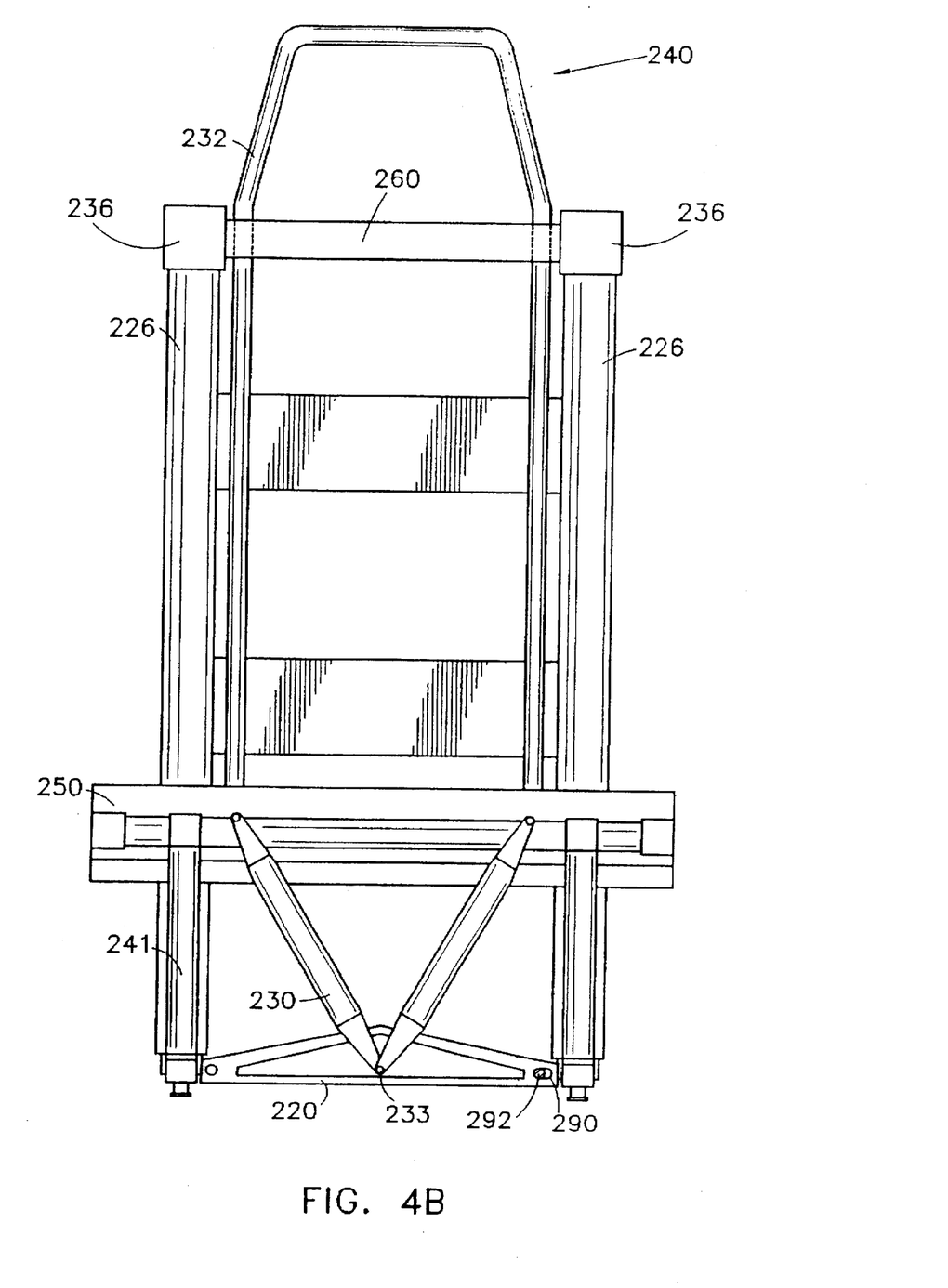
FIG. 4B is a front view of the vehicle seat of FIG. 4A.

Another, preferred, embodiment of the present invention is illustrated in FIGS. 4A and 4B. A vehicle seat 210, shown with an occupant 211 sitting in it, comprises a seat frame 232 which is supported by a horizontal support bar 260. The two ends of support bar 260 are connected by respective couplers 236 to a pair of primary support poles 226, as described in more detail below. The lower ends of poles 226 are pivotally mounted, about an axis denoted "B", on a pair of primary support sites 224 which are located at the rear ends of a respective pair of side support trusses 222.

The front ends of the side support trusses 222 are connected to each other by a connecting support truss 220 positioned perpendicularly to the side trusses and pivotally attached to them. A pair of non-parallel secondary support poles 230 are jointly attached at their lower ends to a single secondary support site 233 positioned at the approximate center of the connecting support truss 220, and are capable of pivoting around the secondary support site 233.

In a preferred embodiment of the invention, seat frame 232 includes a head support portion 240 which is preferably provided with a head cushion (not shown). In an alternative, preferred, embodiment of the invention, not shown in the drawings, head support portion 240 is provided as a separate element which is mounted on horizontal support bar 260.

A pan portion 250, supporting a pan cushion 252, is slidingly attached at its rear end to the primary poles 226 and is pivotably supported at its front end, about an axis denoted "A", by the upper ends of the secondary poles 230. A pair of diagonal support beams 241 extend from axis "A" to axis "B" to provide the structure with longitudinal stability. Thus, as in the previous embodiment, the vehicle seat 210 is supported by three support sites, namely, the two primary support sites 224 and the single secondary support site 233. However, in this embodiment, the secondary site is located anteriorly to the primary sites. It will be obvious to the average skilled man of the art that the upper ends of the secondary support poles 230 could have been jointly attached to a single support site on the front side of the pan portion 250, while the lower ends would then be respectively attached to either end of the connecting support truss 220.

Figure 4C:
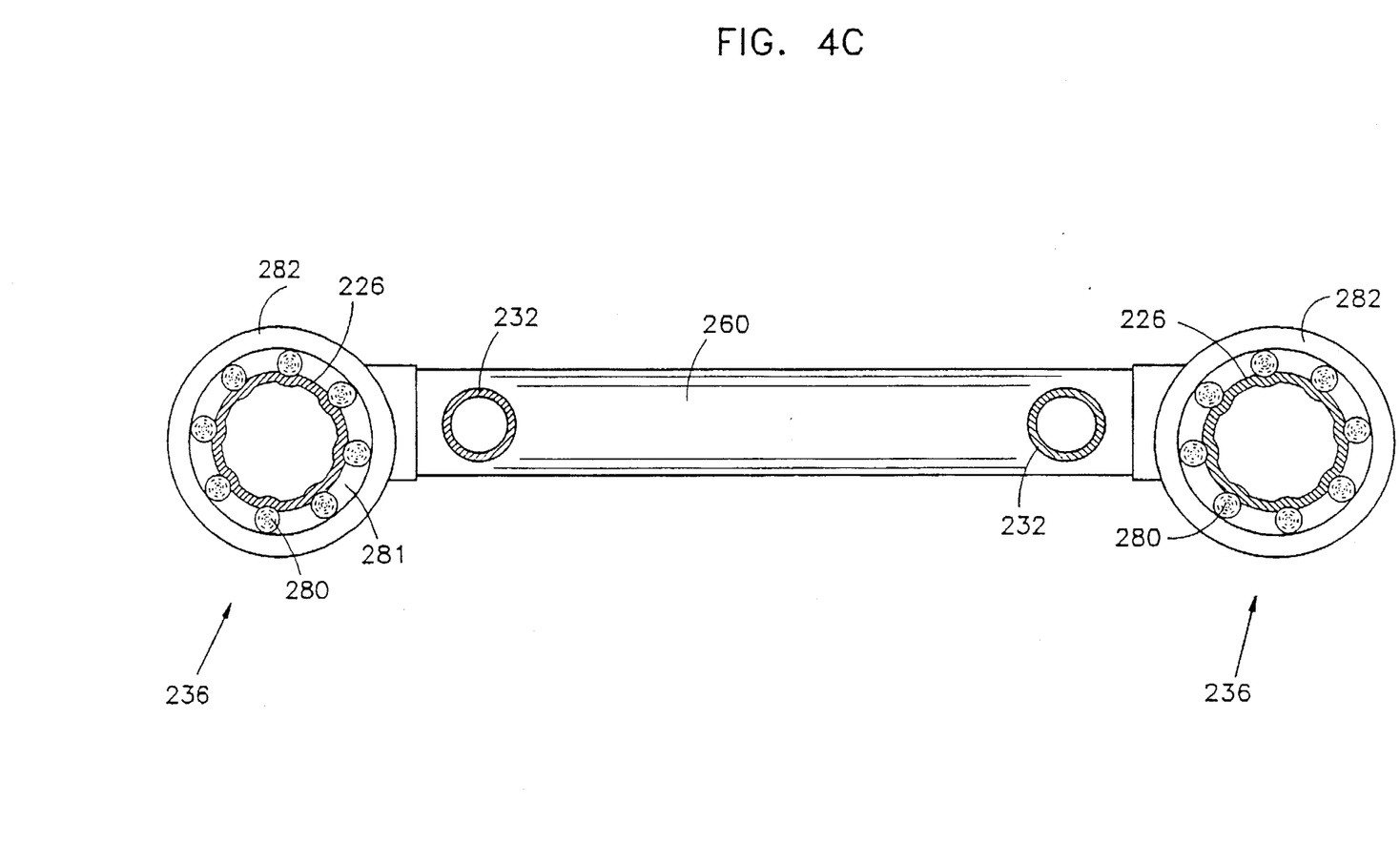
FIG. 4C is a schematic, cross sectional, illustration of coupling apparatus included in the vehicle seat of FIG. 4A, taken across section lines IV—IV.

Reference is now also made to FIG. 4C which schematically illustrates cross sections of couplers 236 connecting the ends of horizontal support bar 260 to primary support poles 226. As shown in FIG. 4C, each of couplers 236 includes a plurality of rigid members 280, preferably rigid metal balls, circumferentially engaging the respective support pole 226 at a respective plurality of inward dents or circular grooves which are preferably formed in the support pole. Members 280 are preferably evenly spaced by a separating cage 281 and are urged against the respective dents in poles 226 by virtue of respective pressure rings 282, preferably formed of a rigid metal, which apply predetermined pressures on members 280. FIG. 4C shows eight rigid members 280 in each coupler 236, however, any suitable number of members 280 may be used, each being associated with a respective indentation or groove in the respective pole 226. As further shown in FIG. 4C, couplers 236 are fixedly connected to the respective ends of horizontal support bar 260.

It should be appreciated that the pressure applied by each ring 282 to members 280 is generally a function of the inward diameter of ring 282 and the number of members 280 used. Thus, the pressure applied to poles 226 may be adjusted by adjusting the diameters of rings 282 or by changing the number of members 280 used. Each of the rings 282 is held in its respective position by a snap ring (not shown), wherein the snap rings hold together the whole coupler 236.

In a preferred embodiment of the invention, during normal operation of the vehicle, vertical sliding of couplers 236 relative to respective support poles 226 is prevented by virtue of the locking engagement between members 280 and the respective dents or grooves in poles 226. However, in the event of a crash in which rapid downward movement of the vehicle including poles 226 is halted suddenly, seat 210 including frame 232 continue to move downwardly, while forcefully drawing firm rigid members 280 along poles 226.

Since rigid members 280 protrude radially inwardly relative to the surfaces of poles 226, the forceful vertical motion of members 280 along poles 226 results in elongated deformation patterns along poles 226. It should be appreciated that this interaction between members 280 and poles 226 dissipates part of the energy involved in the downward impact. Moreover, the controlled downward motion of seat 210 along poles 226 further moderates the impact of the crash on seat 210 and, more importantly, on the occupant of seat 210.

It should be noted that, in normal operating conditions, the pan portion 250 is held stably by the primary and secondary support poles and by the diagonal support beam 241. In the event of a crash situation, however, the rear end of the pan portion 250 slides in a generally downward direction along primary support poles 226, pivoting on axis "A". At the same time, primary support poles 226 are pushed in a generally forward direction, pivoting on axis "B". Thus, the impact energy is absorbed by the seat rather than by its occupant.

It should be further noted that, in a crash situation, the front end of pan portion 250, is firmly supported by secondary poles 230 and, therefore, does not move downwardly. Thus the underseat space between secondary poles 230, diagonal supports beams 241 and side support trusses 222, as best shown in FIG. 4A, remains substantially unaffected by the energy-attenuating downward motion of pan portion 250. This feature of the present invention, hereinafter referred to as articulated attenuation, enables crash-safe use of the underseat space for various purposes. For example, the underseat space provides occupant 211 with crash-safe leg-room. The crash-safe underseat space is also useful for storage of various articles, for example sensitive military equipment. A further advantage of this articulated attenuation is in the fact that occupant is urged generally downwards and backwards, in a crash situation, thereby preventing body damage to occupant 211 from objects in the vicinity of seat 210, particularly in front of the seat.

A further preferred feature for limiting transfer of pitch deformation from the floor to the seat is illustrated in FIG. 4B. On either end of connecting support truss 220 are elongated grooves 290, through each of which protrude a pin 292. In the event that a crash causes an uneven displacement of the floor, resulting in one side of the vehicle seat being lower than the other, the connecting support truss 220 pivots around the secondary support site 233, and the pin 292 moves laterally within the groove 290. This effectively lengthens the connecting support truss, so that the deformation of the floor minimally affects the position of the secondary support poles 230 and generally does not effect the structure of seat 210.

Figure 5A:
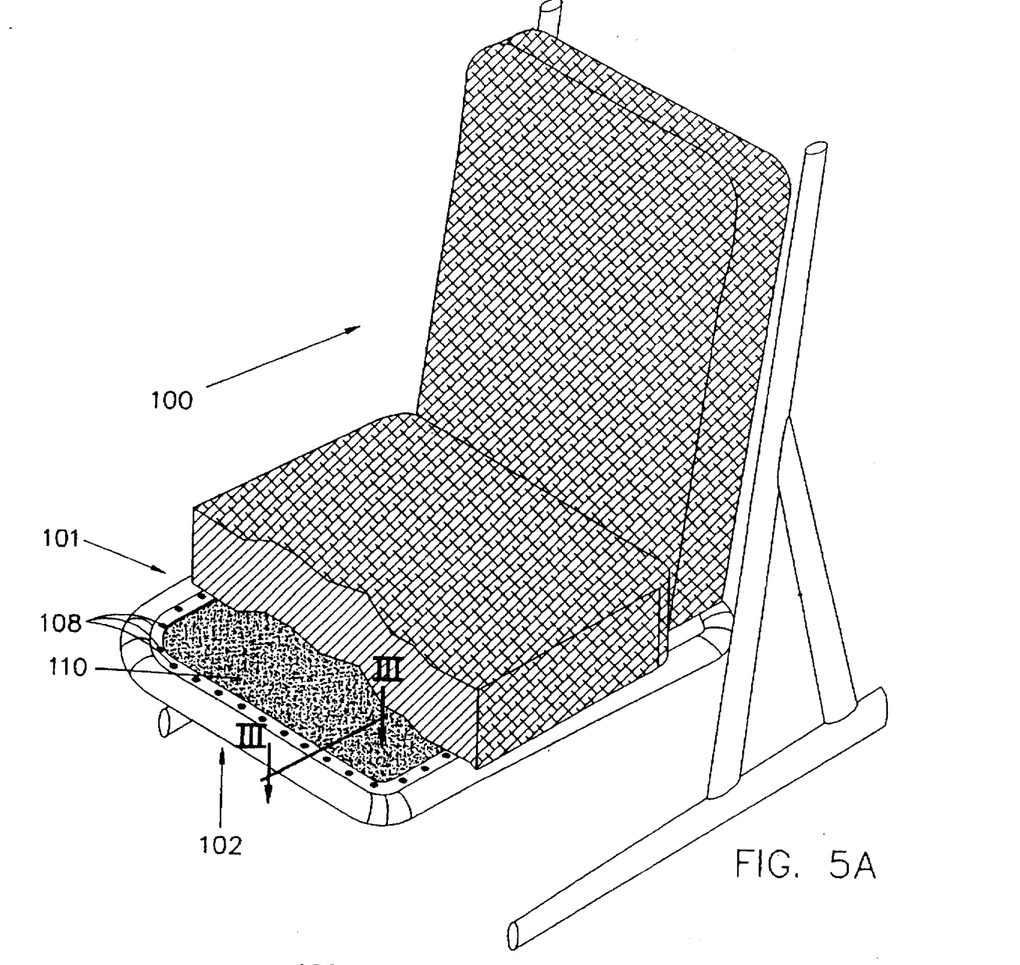
FIG. 5A is a simplified, schematic, illustration of a vehicle seat constructed and operative in accordance with yet another preferred embodiment of the present invention.
Figure 5B:
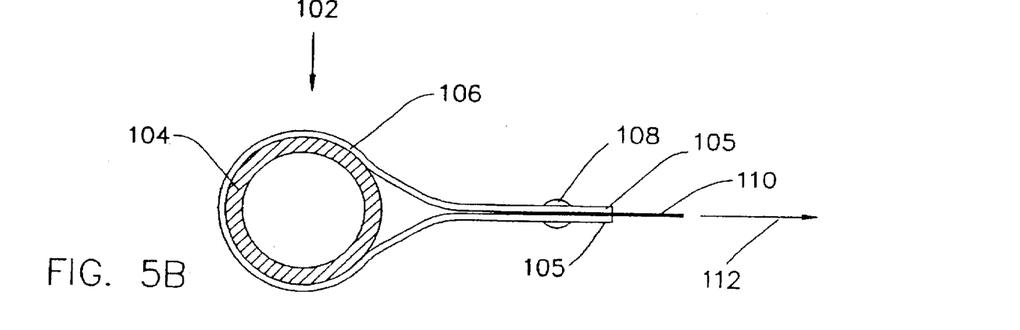
FIG. 5B is a cross-section of part of the seat of FIG. 5A, taken along section lines III—III.

Reference is now made to FIG. 5A which is a simplified illustration of a vehicle seat 100 constructed and operative in a accordance with an alternative embodiment of the present invention, and to FIG. 5B which is a cross section of a front portion 102 of a seat pan 101 of seat 100, taken along section lines III—III. As shown particularly in FIG. 5B, seat pan 101 includes a rigid seat pan frame 104, preferably formed of an aluminum alloy having a tubular profile. A strap 106 formed of a moderately rigid material, preferably a metal strap, is circumferentially associated with seat pan frame 104. The edges 105 of strap 106 are attached to a pan support sheet 110, preferably a metal sheet included in seat pan 101, by means of a .series of pins 108 driven through sheet 110 and edges 105 of strap 106. Pins 108 may be replaced by rivets bolts and the like. The pins may be positioned in parallel along the front and back edges of sheet 110, as shown in FIG. 5A, or, alternatively, along the side edges of the sheet.

In a preferred embodiment of the invention, during normal vehicle operation, the connection between strap 106 to sheet 110 by virtue of pins 108 withstands any forces acting on sheet 110 and/or strap 106. However, when sheet 110 experiences substantial impact perpendicular to sheet 110, which causes tension forces in the direction indicated by arrow 112, either or both of sheet 110 and strap 106 are torn by pins 108. Such tearing, generally perpendicular to the direction of the impact force, attenuates the impact experienced by seat 100. It should be appreciated that in addition to some energy dissipated in the tearing of sheet 110 and/or strap 106, the impact is attenuated also through the somewhat controlled motion of seat 100 along the direction of the tearing.

In a preferred embodiment of the invention, sheet 110, strap 106 and pins 108 are designed such that tearing of sheet 110 and/or strap 106 will occur only when the impact acting perpendicular to the plane of sheet 110 exceeds a preselected threshold typical of a crash situation. It should be appreciated that although the apparatus of FIGS. 5A and 5B is particularly suitable for generally vertical impact attenuation, similar apparatus may be employed at the back of seat 100 to provide generally horizontal impact attenuation.

It should be appreciated that any or all of the above mentioned energy attenuation apparatus may be employed in a given vehicle seat, preferably an aircraft pilot seat.

It will be appreciated by persons skilled in the art that the present invention is not limited to what has been thus far described but, rather, the scope of the present invention is limited only by the following claims:

We claim:

1. A vehicle seat for absorbing energy exerted on the seat during impact comprising;

a seat frame;

a mounting structure associated with a vehicle floor and having a pair of primary support sites and a single, secondary support site located substantially on a line which is a perpendicular bisector of a line between said primary support site;

a pair of substantially parallel primary support poles for supporting said seat frame, said poles being coupled to said seat frame and respectively mounted on said pair of primary support sites; and a pair of non-parallel secondary support poles for supporting said seat frame, jointly mounted on said secondary support site.

2. A vehicle seat according to claim 1 wherein the mounting structure comprises a pair of side support trusses and a connecting support truss, said connecting support truss being positioned perpendicularly to and in between said side support trusses, and wherein said pair of primary support sites are respectively located on the side support trusses and said secondary support site is located on the connecting support truss.

3. A vehicle seat according to claim 2 wherein said connecting support truss is capable of effectively lengthening as a result of a displacement of either of said side trusses.

4. A vehicle seat according to claim 3 wherein said effective lengthening is obtained by a pair of lengthening mechanisms located at either end of said connecting support truss, proximate to said side support trusses.

5. A vehicle seat according to claim 1 wherein said secondary support poles are pivotally mounted on said secondary support site.

6. A vehicle seat according to claim 1 wherein said secondary support site is located anteriorly to said primary support sites.

7. A vehicle seat according to claim 6 wherein said secondary support poles are coupled to said seat frame.

8. A vehicle seat according to claim 6 wherein said primary support poles are pivotally mounted on said pair of primary support sites.

9. A vehicle seat according to claim 1 wherein said secondary support site is located posteriorly to said primary support sites.

10. A vehicle seat according to claim 9 wherein said secondary support poles are coupled to said primary support poles.

11. A vehicle seat according to claim 9 and further comprising:

a rigid seat pan frame;

a connecting strap firmly associated with at least a portion of said rigid frame;

a passenger support sheet; and a plurality of tearing pins driven through the support sheet and the connecting strap such that tearing of at least the support sheet by said pins occurs only when the impact acting on the support sheet exceeds a preselected level.

12. A vehicle seat according to claim 1 and further comprising at least one pair of parallel rails, fixedly mounted on the vehicle floor, wherein said mounting structure is slidably mounted on the at least one pair of rails.

13. A vehicle seat according to claim 12 wherein the pair of side support trusses are mounted on the at least one pair of rails, one side truss on each rail, and wherein said connecting support truss is mounted across the side support trusses.

14. A vehicle seat according to claim 1, wherein said seat frame comprises at least one generally vertical segment, and wherein said substantially parallel support poles are generally vertical, and further comprising at least one coupler fixedly mounted on the at least one pole of said support apparatus and circumferentially mounted on the at least one generally vertical segment of said seat frame, said at least one coupler having at least one deformation member engaging one of an indentation and a groove on the at least one segment such that displacement of said seat frame relative to said support apparatus occurs only when the impact acting on said seat frame exceeds a preselected threshold.

15. A vehicle seat according to claim 14 wherein the at least one deformation member deforms said segment of the seat frame when the impact acting on said seat frame exceeds a preselected threshold.

16. A vehicle seat according to claim 14, wherein the at least one deformation member forms a predetermined deformation pattern along the at least one segment of said seat frame when said displacement occurs, thereby dissipating at least part of the impact energy.

17. A vehicle seat according to claim 14, wherein the at least one deformation member of the at least one coupler comprises at least one rigid ball associated with one of an indented portion and a grooved portion of the at least one segment of the seat frame and wherein the predetermined deformation pattern comprises an extension of said indented portion.

18. A vehicle seat according to claim 16, wherein the at least one generally vertical segment of said seat frame comprises at least one tubular portion and wherein the at least one coupler is circumferentially associated with the tubular portion.

19. A vehicle seat according to claim 14 and further comprising an inner frame tiltably adjustable with respect to said seat frame.

20. A vehicle seat according to claim 14 and further comprising:

a seat pan frame;

a passenger support sheet; and a plurality of pins driven through the support sheet which connect the passenger support sheet to the rigid frame and adapted to tear the passenger support sheet when the impact acting on the support sheet exceeds a preselected level.

21. A vehicle seat for absorbing energy exerted on the seat during impact comprising:

a seat frame;

a support apparatus including at least one generally vertical pole; and at least one coupler fixedly mounted to the seat frame and circumferentially mounted on the at least one pole of said support apparatus, the at least one coupler having at least one deformation member engaging one of an indentation and a groove in the at least one pole such that displacement of said seat frame relative to said support apparatus occurs only when the force of said impact acting on said seat frame exceeds a preselected threshold, further comprising a seat pan having a front portion, wherein the support apparatus further includes a front support structure which supports the front portion of the seat pan to prevent vertical motion of said front portion, and further comprising a mounting structure associated with a vehicle floor and having a pair of primary support sites and a single, secondary support site, wherein the front support structure is mounted on said secondary support site and wherein the at least one generally vertical poles includes a pair of vertical support poles respectively mounted on said pair of primary support sites.

22. A vehicle seat according to claim 21 wherein the front support structure comprises a pair of non-parallel support poles jointly mounted on said secondary support site.

23. A vehicle seat according to claim 21, wherein said support apparatus further comprises a pair of diagonal support beams connected to respective ends of said front portion of the seat pan and respectively mounted on said pair primary support sites.

24. A vehicle seat according to claim 21, wherein the at least one deformation member forms a predetermined deformation pattern along the at least one pole of said support apparatus when said displacement occurs, thereby dissipating at least part of the impact energy.

25. A vehicle seat according to claim 21, wherein the at least deformation member of the at least one coupler comprises at least one rigid ball associated with one of an indented portion and a grooved portion of the at least one pole of the support apparatus and wherein the predetermined deformation pattern comprises an extension of said one of an indented portion and a grooved portion.

26. A vehicle seat according to claim 21, wherein the at least one pole comprises at least one tubular portion and wherein the at least one coupler is circumferentially associated with the tubular portion.

* * * * *